US011111402B2

(12) United States Patent
Zhou et al.

(10) Patent No.: US 11,111,402 B2
(45) Date of Patent: Sep. 7, 2021

(54) PRINTABLE COMPOSITIONS

(71) Applicant: HEWLETT-PACKARD DEVELOPMENT COMPANY, L.P., Spring, TX (US)

(72) Inventors: Zhang-Lin Zhou, San Diego, CA (US); Gregg A. Lane, San Diego, CA (US); Rodney David Stramel, San Diego, CA (US); Qianhan Yang, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/618,724

(22) PCT Filed: Sep. 25, 2017

(86) PCT No.: PCT/US2017/053242
§ 371 (c)(1),
(2) Date: Dec. 2, 2019

(87) PCT Pub. No.: WO2019/059945
PCT Pub. Date: Mar. 28, 2019

(65) Prior Publication Data
US 2020/0131380 A1    Apr. 30, 2020

(51) Int. Cl.
| | | |
|---|---|---|
| C08F 2/46 | (2006.01) |
| C08F 2/50 | (2006.01) |
| C08G 61/04 | (2006.01) |
| C09D 11/101 | (2014.01) |
| C08G 18/12 | (2006.01) |
| C08G 18/28 | (2006.01) |
| C08G 18/62 | (2006.01) |
| C08G 18/67 | (2006.01) |
| C08G 18/75 | (2006.01) |
| C08G 18/76 | (2006.01) |
| C08L 75/04 | (2006.01) |
| C09D 11/322 | (2014.01) |
| G03G 7/00 | (2006.01) |

(52) U.S. Cl.
CPC ............ *C09D 11/101* (2013.01); *C08G 18/12* (2013.01); *C08G 18/2865* (2013.01); *C08G 18/6229* (2013.01); *C08G 18/6715* (2013.01); *C08G 18/755* (2013.01); *C08G 18/7671* (2013.01); *C08L 75/04* (2013.01); *C09D 11/322* (2013.01); *G03G 7/0053* (2013.01)

(58) Field of Classification Search
CPC ... C08L 75/04; G03G 7/0053; C08G 18/2865; C08G 18/7671; C08G 18/6715; C08G 18/281; C08G 18/246; C08G 28/755; C08G 18/12; C08G 18/0823; C08G 18/6241; C08G 18/6229; C08G 18/10; C08G 18/758; C09D 11/322; C09D 11/101; C09D 175/04; C09D 175/06
USPC .......................................... 522/87, 1; 520/1
See application file for complete search history.

(56) References Cited

U.S. PATENT DOCUMENTS

| | | | |
|---|---|---|---|
| 3,725,353 A | 4/1973 | Fujimoto et al. | |
| 5,736,587 A * | 4/1998 | Sungail | C08G 18/225 521/125 |
| 6,365,697 B1 | 4/2002 | Kim et al. | |
| 9,085,707 B2 | 7/2015 | Chevli et al. | |
| 9,499,706 B2 | 11/2016 | Jackson et al. | |
| 2005/0288430 A1 | 12/2005 | Gindin et al. | |
| 2011/0065849 A1 | 3/2011 | Huang | |
| 2011/0102529 A1 | 5/2011 | Hiroyuki et al. | |
| 2013/0144007 A1 | 6/2013 | Zastrow et al. | |
| 2014/0378611 A1 * | 12/2014 | Nakao | C08G 18/3821 524/839 |

FOREIGN PATENT DOCUMENTS

| | | | | |
|---|---|---|---|---|
| WO | WO-2014063920 A1 * | 5/2014 | .......... | C08G 18/755 |
| WO | WO-2017074349 | 5/2017 | | |

OTHER PUBLICATIONS

Beck et al, WO 2014063920 Machine Translation, May 1, 2014 (Year: 2014).*

* cited by examiner

*Primary Examiner* — Jessica Whiteley
(74) *Attorney, Agent, or Firm* — Dicke Billig & Czaja PLLC

(57) ABSTRACT

Printable compositions comprising a liquid carrier; and a radiation curable polyurethane dispersed in the liquid carrier are described, as well as methods of preparing the printable compositions and methods of printing using the printable compositions.

20 Claims, No Drawings

PRINTABLE COMPOSITIONS

CROSS-REFERENCE TO RELATED APPLICATIONS

This Utility Patent Application is a U.S. National Stage filing under 35 U.S.C. § 371 of PCT/US2017/053242, filed Sep. 25, 2017, incorporated by reference herein.

In addition to home and office usage, inkjet technology has been expanded to high-speed, commercial and industrial printing. Inkjet printing is a non-impact printing method that utilizes electronic signals to control and direct droplets or a stream of ink. Some commercial and industrial inkjet printers utilize fixed printheads and a moving substrate web in order to achieve high speed printing.

Current inkjet printing technology involves forcing the ink drops through small nozzles by thermal ejection, piezoelectric pressure or oscillation onto the media substrate. Inkjet technology has become a popular way of recording images on various media surfaces (e.g., paper), for a number of reasons, including, low printer noise, capability of high-speed recording and multicolor recording.

Polyurethane dispersions may be added to inkjet inks to improve the durability of the resulting print.

DETAILED DESCRIPTION

Before the printable composition and related aspects are disclosed and described, it is to be understood that this disclosure is not limited to the particular materials and process steps disclosed herein because such materials and process steps may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein. "printable composition" generally refers to a composition that is typically suitable for use in an inkjet printing process. The printable composition may be substantially colorless, and suited for use as an overcoat, or may include a colorant and be suited for use as an inkjet ink. The printable composition generally includes a curable polyurethane dispersion as described herein.

As used herein, "copolymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect or any other feature described herein.

In an aspect there is provided a printable composition, comprising:
   a liquid carrier; and
   a radiation curable polyurethane dispersed in the liquid carrier, the curable polyurethane formed from:
      a polyisocyanate;
      a (meth)acrylate-containing polyol;
      a mono-alcohol having (meth)acrylate functionality; and
      an amino acid.

In a related aspect there is provided a method of preparing a printable composition, comprising:
   reacting a polyisocyanate and a (meth)acrylate-containing polyol to form a polyurethane pre-polymer,
   reacting the polyurethane pre-polymer with a mono-alcohol having (meth)acrylate functionality to form a functionalised polyurethane pre-polymer; and
   reacting the functionalised polyurethane pre-polymer with an amino acid to form a radiation curable polyurethane; and
   dispersing the radiation curable polyurethane in a liquid carrier.

In a further related aspect there is provided a method of printing, comprising: printing a composition comprising:
   a liquid carrier; and
   a radiation curable polyurethane dispersed in the liquid carrier, the curable polyurethane formed from:
      a polyisocyanate;
      a (meth)acrylate-containing polyol;
      a mono-alcohol having (meth)acrylate functionality; and
      an amino acid; and
   irradiating the printed composition.

One of the major challenges of UV-LED curable coating and printing inks based on curable polyurethane dispersions is pH instability. Most commercially available curable acrylate based polyurethane dispersions are not pH stable, showing over 1 unit pH drop after 1 week at accelerated storage life. This pH drop causes the pigment dispersion to crash out in the inks rendering them unusable in inkjet printing. The polyurethane dispersions of the present disclosure are stable under basic aqueous conditions and so address these stability issues and are useful as UV-LED curable coatings and inks, for example in inkjet printing.

Printable Composition

Liquid Carrier

The printable composition comprises a liquid carrier, in which the radiation curable polyurethane is dispersed. In one example, the liquid carrier comprises any suitable liquid in which the radiation curable polyurethane can be stably dispersed. In one example, the liquid carrier comprises any carrier suitable for inkjet printing in which the radiation curable polyurethane can be stably dispersed. In one example, the liquid carrier comprises a main carrier or solvent and a co-carrier, or co-solvent. In one example, the liquid carrier comprises water.

In one example, the co-solvent(s) may be present in the printable composition in an amount ranging from about 0.1 wt % to about 30 wt %, depending, at least in part, on the jetting architecture to be used. In an example, the co-solvent is present in the printable composition in an amount of about 10 wt % based on the total wt % of the inkjet ink. It is to be understood that other amounts outside of this example and range may also be used. Classes of co-solvents that may be used include organic co-solvents, such as aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, both substituted and unsubstituted formamides, both substituted and unsubstituted acetamides, and the like. In some examples, the ink vehicle may include 1-(2-hydroxyethyl)-2-pyrrolidone.

Radiation Curable Polyurethane

The printable composition comprises a radiation curable polyurethane dispersed in the carrier liquid. In an example, the radiation curable polyurethane is present in the printable composition as a dispersion in water, i.e. a dispersion of the radiation curable polyurethane in water is added to the carrier liquid along with any other components of the printable composition.

In one example, the radiation curable polyurethane is present in the printable composition in an amount ranging from greater than 1 wt % to about 20 wt % based upon the total wt % of the printable composition. In another example, the amount of radiation curable polyurethane ranges from about 5 wt % to about 20 wt % or from greater than 5 wt % to about 15 wt % based upon the total wt % of the printable composition. Unless otherwise stated, this weight percentage refers to the weight percent of a polyurethane dispersion added to the printable composition, and not to the total amount of polyurethane polymer in the printable composition.

The radiation curable polyurethane may be formed by synthesizing a polyurethane solution (i.e., the polyurethane polymer in an organic solvent), and then ionizing and dispersing the polyurethane solution in water to form a radiation curable polyurethane dispersion. The resulting radiation curable polyurethane dispersion includes the radiation curable polyurethane, which is water soluble/dispersible. Each of these steps will be discussed further below.

The radiation curable polyurethane is formed from the following components: (a) a polyisocyanate; (b) a (meth)acrylate-containing polyol; (c) a mono-alcohol having (meth)acrylate functionality; and (d) an amino acid.

For component (a), any suitable polyisocyanate may be used. For example, a polyisocyanate having an average of two or more isocyanate groups may be used. In an example, the polyisocyanate may be an aliphatic, cycloaliphatic, araliphatic, or aromatic polyisocyanate, as well as products of their oligomers, used alone or in mixtures of two or more. In an example, the polyisocyanate is an aliphatic polyisocyanate or a cycloaliphatic polyisocyanate. Some example polyisocyanates include hexamethylene-1,6-diisocyanate (HDI), 2,2,4-trimethyl-hexamethylene-diisocyanate (TMDI), 1,12-dodecane diisocyanate, 2,4,4-trimethyl-hexamethylene diisocyanate, 2-methyl-1,5-pentamethylene diisocyanate, isophorone diisocyanate (IPDI), 4,4'-methylene diphenyl diisocyanate (MDI), 4,4'-methylenebis(cyclohexyl isocyanate) (H12MDI), ortho-, meta- or para-tetramethyl-xylylene diisocyanate TMXDI), and combinations thereof.

In one example, the polyisocyanate has a molecular weight of less than 1000. In one example, the polyisocyanate has a molecular weight of less than 750, for example less than 500, for example less than 400, for example less than 300. In one example, the polyisocyanate has a molecular weight of at least 300. In one example, the polyisocyanate has a molecular weight of at least 400, for example at least 500, for example at least 750, for example at least 1000.

The amount of the polyisocyanate monomer within the polyurethane ranges from about 20 wt % to about 50 wt % of the total wt % of the polyurethane. In an example, polyisocyanate makes up from about 30 wt % to about 50 wt % of the polyurethane. In an example, polyisocyanate makes up from about 40 wt % to about 50 wt % of the polyurethane.

Turning to component (b), the amount of component (b) (i.e., the polyol) within the polyurethane ranges from about 10 wt % to about 70 wt % of the total wt % of the polyurethane. In an example, component (b) (i.e., the polyol) makes up from about 30 wt % to about 60 wt % of the polyurethane, for example from about 30 wt % to about 50 wt % of the polyurethane, for example from about 30 wt % to about 40 wt % of the polyurethane.

Component (b) is a (meth)acrylate-containing polyol. The term "(meth)acrylate-containing polyol", as used herein in connection with component (b), means any product having at least two hydroxyl groups and at least one acrylate group or at least one methacrylate group. In some examples, the (meth)acrylate-containing polyol comprises a diol having (meth)acrylate functionality. In some examples, the (meth)acrylate-containing polyol comprises a triol having (meth) acrylate functionality. In some examples, the (meth)acrylate-containing polyol comprises at least two acrylate groups or two methacrylate groups.

Component (b) is present in an amount ranging from 10 wt % to about 50 wt % based on the total wt % of the radiation curable polyurethane. In another example, component (b) may be present in an amount ranging from about 20 wt % to about 40 wt % based on the total wt % of the radiation curable polyurethane, for example in an amount ranging from about 30 wt % to about 40 wt % of the total weight % of the radiation curable polyurethane.

Component (b) renders the polyurethane curable via ultraviolet light or some other suitable electromagnetic radiation. In addition, component (b) increases the double bond density and improves the curing efficiency.

In some examples, the (meth)acrylate-containing polyol has a molecular weight ranging from about 200 to about 1000, for example from about 300 to about 900, for example from about 400 to about 800, for example from about 500 to about 700. In some examples, the (meth)acrylate-containing polyol has a molecular weight of at least 200, for example at least 300, for example at least 400, for example at least 500, for example at least 600, for example at least 700, for example at least 800, for example at least 900, for example about 1000.

In some examples, the (meth)acrylate-containing polyol has a molecular weight of less than 1000, for example less than 900, for example less than 800, for example less than 700, for example less than 600, for example less than 500, for example less than 400, for example less than 300, for example about 200.

Some examples of the (meth)acrylate-containing polyol include those obtained from the reaction of diglycidyl compounds with (meth)acrylic acid. Aliphatic diglycidyl compounds derived from alpha, omega diols having 4 to 12 carbon atoms or from polyoxyalkylenediols (such as polyethylene glycol, polypropylene glycol, or mixtures thereof that contain oxyalkylene group(s)) may be used. Some specific examples include (meth)acrylate-containing polyols derived from 1,4-butanediol diglycidyl ether (acrylate version available as DA-214L from Nagase America), 1,6-hexanediol diglycidyl ether (acrylate version available as DA-212L from Nagase America), cyclohexanedimethanol diglycidyl ether, polyethylene glycol diglycidyl ether, polypropylene glycol diglycidyl ether, resorcinol diglycidyl ether (methacrylate version available as DM-201 from Nagase America), hydrogenated bisphenol A diglycidyl ether (BGDA or BADGE), hydrogenated bisphenol F diglycidyl ether, and their ethoxylated and/or propoxylated equivalents. Some commercially available examples include MIRAMER® PE-210 (bisphenol A epoxy acrylate) and MIRAMER® PE-230 (aliphatic alkyl epoxy acrylate) (both of which are available from Miwon Chemical).

In further examples, the (meth)acrylate-containing polyol includes diglycidyl esters, such as diglycidyl phthalate, N,N-diglycidyl aniline, or N,N-diglycidyl-4-glycidyloxyaniline. Some specific examples include a diacrylate ester of bisphenol A diglycidyl ether (BGDA) and a dimethacrylate ester of bisphenol A diglycidyl ether (BGDMA), a diacrylate ester of hydrogenated bisphenol A diglycidyl ether and a dimethacrylate ester of bisphenol A diglycidyl ether.

In some examples, the (meth)acrylate-containing polyol does not include, contain or comprise any acid functionality, for example any carboxylic acid functionality.

Component (c) is a mono-alcohol having (meth)acrylate functionality. The term "mono-alcohol having (meth)acrylate functionality", as used herein in connection with component (c), means any compound having a single hydroxyl group with at least one acrylate group or at least one methacrylate group. Component (c) renders the polyurethane curable via ultraviolet light or some other suitable electromagnetic radiation. In addition, component (c) increases the double bond density and improves the curing efficiency. In addition, component (c) can introduce extra functionality into the polyurethane if required, as well as providing a partial capping function of unreacted isocyanate groups after reaction of the polyisocyanate and polyol. In some examples, the mono-alcohol having (meth)acrylate functionality does not include, contain or comprise any acid functionality, for example any carboxylic acid functionality.

The amount of component (c) in the radiation curable polyurethane ranges from greater than 10 wt % to about 50 wt % based upon the total wt % of the radiation curable polyurethane. In an example, component (c) makes up from about 10 wt % to about 25 wt % of the polyurethane, for example from about 10 wt % to about 20 wt %. Within the final polyurethane, component (c) serves as a first capping group and forms an end acrylate.

Some examples of component (c) include the esterification products of aliphatic and/or aromatic polyols with acrylic acid or methacrylic acid. These products have a residual OH functionality of 1. Some of these products also have at least two acrylic functionalities. Examples of component (c) include the partial esterification products of acrylic acid and/or methacrylic acid with tri-, tetra-, penta- or hexahydric polyols or mixtures thereof. These modified or unmodified polyols are partly esterified with acrylic acid, methacrylic acid or mixtures thereof until the desired residual hydroxyl functionality is reached.

Suitable examples include acrylic or methacrylic esters with linear and branched polyols in which one hydroxyl functionality remains free, such as hydroxyalkylacrylates or hydroxyalkylmethacrylates having 1 to 20 carbon atoms in the alkyl group. Some specific examples include hydroxyethylacrylate (HEA), hydroxyethylmethacrylate (HEMA), hydroxybutylacrylate (HBA), hydroxybutylmethacrylate (HBMA), (3-(acryloxy)-2-hydroxypropyl methacrylate) (AHPMA), 2-Hydroxy-3-phenoxypropyl acrylate, glycerol diacrylate, trimethylolpropane diacrylate, pentaerythritoitriacrylate (PETA), ditrimethylolpropane triacrylate (DTPTA), dipentaerythritol pentaacrylate (DPPA), and (poly)ethoxylated and/or (poly)propoxylated equivalents of glycerol diacrylate, trimethylolpropane diacrylate, PETA, DTPTA, or DPPA. Other examples include the corresponding amide products, such as hydroxyethylacrylamide (HEAA).

For component (d), any suitable amino acid may be used. For example, the amino acid may be a naturally occurring or non-naturally occurring amino acid. The term "amino acid" as used herein refers to any compound having at least one amino group and at least one acid group, for example a carboxylic acid group.

In some examples, the amino acid comprises a chiral amino acid and is enantiomerically pure. In some examples, the amino acid comprises a chiral amino acid and comprises a racemic mixture of two enantiomers. In some examples, the amino acid comprises an L-amino acid. In some examples, the amino acid comprises a D-amino acid. In some examples, the amino acid comprises one or more of glycine, 1-alanine, 2-alanine, valine, glutamine, asparagine, aspartic acid, glutamic acid, phenylalanine, proline, isoleucine and leucine.

In some examples, the amount of component (d) in the radiation curable polyurethane ranges from greater than 1 wt % to about 10 wt % based upon the total wt % of the radiation curable polyurethane. In an example, component (d) makes up from about 2 wt % to about 9 wt % of the polyurethane, for example from about 3 wt % to about 8 wt %, for example from about 4 wt % to about 7 wt %. Within the final polyurethane, the amino acid serves as a final capping group to react with any previously unreacted isocyanate groups (to form urea groups). The acid functionality of the amino acid provides stability in aqueous solution to the polyurethane disperision.

In some examples, the components (a) and (b) are selected to have a NCO/OH (isocyanate to hydroxyl) ratio of at least 1.2. In some examples, the ratio of (a) and (b), i.e. the ratio of polyisocyanate to (meth)acrylate-containing polyol used to form the polyurethane is at least 1.5, for example at least 2, for example at least 3, for example at least 4, for example at least 5.

In some examples, the ratio of polyisocyanate to (meth) acrylate-containing polyol used to form the polyurethane is less than 5, for example less than 4, for example less than 3, for example less than 2, for example about 1.2. In some examples, the ratio of polyisocyanate to (meth)acrylate-containing polyol used to form the polyurethane is from 1.2 to 5, for example from 1.5 to 4, for example from 1.8 to 3, for example from 2 to 2.5.

In some examples, the resulting radiation curable polyurethane has a double bond density ranging from about 1.0 meq/g to about 10.0 meq/g, for example from about 1.5 meq/g to about 5.0 meq/g, for example from about 2.0 meq/g to about 3.0 meq/g.

In some examples, the resulting radiation curable polyurethane has an acid number ranging from about 20 mg/g to about 100 mg/g, for example from about 25 mg/g to about 80 mg/g, for example from about 30 mg/g to about 70 mg/g, for example from about 30 mg/g to about 50 mg/g, for example from about 30 mg/g to about 40 mg/g.

The printable composition may also include a photoinitiator. The photoinitiator initiates the polymerization and/or crosslinking of the radiation curable polyurethane upon exposure to a suitable stimulus (e.g., electromagnetic radiation in the form of UV light or an LED). Some examples of the photoinitiator include 1-[4-(2-Hydroxyethoxy)-phenyl]-2-hydroxy-2-methyl-1-propane-1-one (which is commercially available from BASF Corp. as IRGACURE® 2959); acyl phosphine oxide photoinitiators (e.g., IRGACURE® 819, commercially available from BASF Corp.); alpha hydroxy ketone photoinitiators (e.g., IRGACURE® 184, commercially available from BASF Corp.); Iodonium, (4-methylphenyl)[4-(2-methylpropyl) phenyl]-, hexafluorophosphate(I-) (which is commercially available from BASF Corp. as IRGACURE® 250); a high-molecular-weight sulfonium salt (e.g., IRGACURE® 270, commercially available from BASF Corp.); 2-Benzyl-2-dimethylamino-1-(4-morpholinophenyl)-butanone-1 (which is commercially available from BASF Corp. as IRGACURE® 369); alpha amino ketone photoinitiator (e.g., IRGACURE® 379, commercially available from BASF Corp.): a liquid blend of alpha hydroxy ketone/benzophenone photoinitiator (e.g., IRGACURE® 500, commercially available from BASF Corp.); and a liquid photoinitiator blend of acyl phosphine oxide/alpha hydroxy ketone (e.g., IRGACURE® 2022, commercially available from BASF Corp.). Some other suitable photoinitiators include phosphine oxide derivatives, thioxanthone derivatives, and benzophenone derivatives. The photoinitiator is present in the printable composition in an amount ranging from about 0.1 wt % to about 1.0 wt % of the total wt % of the printable composition. In another example, the photoinitiator is present in the printable composition in an amount ranging from about 0.2 wt % to about 0.6 wt. % of the total wt % of the printable composition.

In some examples, a water-soluble photoinitiator may be used in the printable composition. The water soluble photoinitiator may be a trimethylbenzoylphenylphosphinic acid metal salt (i.e., TPA salt) having a formula of:

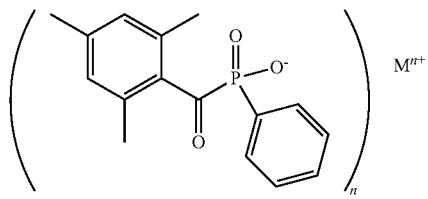

where n is any integer from 1 to 5 and M is a metal with a valence from 1 to 5. Examples of suitable metals include Li, Na, K, Cs, Rb, Be, Mg, Ca, Ba, Al, Ge, Sn, Pb, As, and Sb.

The TPA salt may be formed from ethyl (2,4,6-trimethylbenzoyl) phenylphosphinate (TPO-L) and a metal salt. The ethyl (2,4,6-trimethylbenzoyl) phenylphosphinate may be added to a suitable solvent (e.g., methyl ethyl ketone (MEK)) to form a solution, and then the metal salt may be added to the solution. The solution may be heated and stirred at a predetermined temperature for a predetermined time to allow the reaction to take place. As a result of the reaction, a solid TPA salt may form. This salt may be collected, washed, and dried.

Two example synthetic pathways for forming a lithium TPA salt (TPA-Li) and a sodium TPA salt (TPA-Na) are shown in the schemes below:

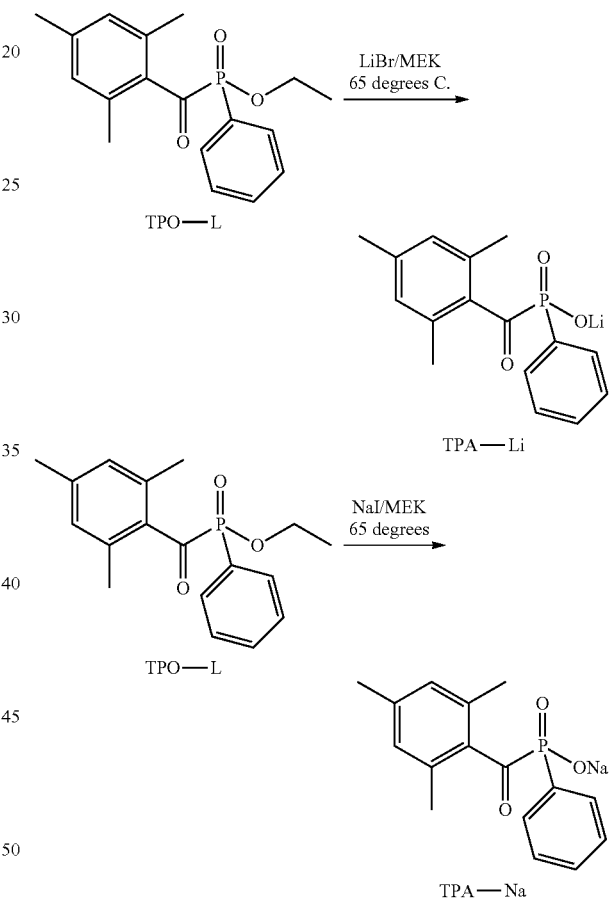

The solubility of the water soluble photoinitiator disclosed herein may be high. In one example, the water soluble photoinitiator can have a water solubility of at least 0.1 wt %. When the water solubility is at least 0.1 wt %, it means that of the total wt % of the water soluble photoinitiator added to water, at least 0.1 wt % of the total is water soluble. In some instances, the water soluble photoinitiator may have a water solubility of at least 0.5 wt %. In some instances, the water soluble photoinitiator may have a water solubility up to about 20 wt %.

The water soluble photoinitiator may be used in combination with a sensitizer. The sensitizer may be a water soluble polymeric sensitizer that includes a functionalized anthrone moiety, a polyether chain, and an amide linkage or an ether linkage attaching one end of the polyether chain to the functionalized anthrone moiety. The anthrone moiety may be a thioxanthrenone moiety.

In one example, the polymeric sensitizer may have the formula:

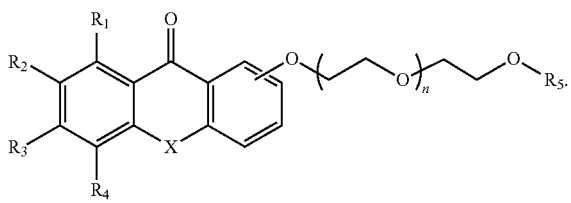

where $R_1$, $R_2$, $R_3$, $R_4$, and $R_5$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, $-NO_2$, $-O-R_d$, $-CO-R_d$, $-CO-O-R_d$, $-O-CO-R_d$, $-CO-NR_dR_e$, $-NR_dR_e$, $-NR_d-CO-R_e$, $-NR_d-CO-O-R_e$, $-NR_d-CO-NR_eR_f$, $-SR_d$, $-SO-R_d$, $-SO_2-R_d$, $-SO_2-O-R_d$, $-SO_2NR_dR_e$ and a perfluoroalkyl group. $R_d$, $R_e$, and $R_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group. Some examples of suitable alkyl groups include methyl, ethyl, propyl, isopropyl, butyl, isobutyl, pentyl, hexyl, etc. One example of a suitable alkene group is an ethylene group. Some examples of suitable aryl groups include phenyl, phenylmethyl, etc. In the formula Q above, X is O, S, or NH and the polyether chain has n number of repeating monomer units, where n ranges from 1 to 200. As shown in the formula Q above, the linkage is an ether linkage. One example of a suitable sensitizer is termed M-TX-PEG-350, which comprises a thioxanthrenone moiety coupled to a methoxy-terminated PEG-350 chain.

When present, the sensitizer may be present in an amount of 0.1 wt % to about 10 wt % of the inkjet ink composition.

The photoinitiator may be present in the overcoat composition in an amount ranging from about 0 wt % to about 20 wt. % of the total wt % of the overcoat composition. In another example, the photoinitiator is present in the in the inkjet ink in an amount ranging from about 0.2 wt % to about 15 wt %, for example, 0.5 wt % to 10 wt % or 0.5 to 5 wt % of the total wt % of the overcoat composition.

The printable composition may also include a surfactant(s). As an example, the printable composition may include non-ionic, cationic, and/or anionic surfactants, which may be present in an amount ranging from about 0.01 wt % to about 5 wt % based on the total wt % of the printable composition. In at least some examples, the printable composition may include a silicone-free alkoxylated alcohol surfactant such as, for example, TEGO® Wet 510 (Evonik Tego Chemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylated acetylenic diol), CARBOWET® GA-21 1 (a.k.a. SURFYNOL® CT-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®), which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

The printable composition may include an anti-kogation agent. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS® O3A or CRODAFOS® N-3 acid from Croda Int.) or dextran 500 k. Other suitable examples of the anti-kogation agents include CRODAFOS® HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the printable composition in an amount ranging from about 0.05 wt % to about 2 wt % of the total wt % of the printable composition.

In some examples disclosed herein, the printable composition may also include antimicrobial agent(s) (biocide(s)), viscosity modifier(s), material(s) for pH adjustment, sequestering agent(s), preservative(s), jettability additive(s) (e.g., liponic ethylene glycol (LEG-1), available from Liponics), and the like.

When a biocide is utilized, a suitable amount of the biocide may range from about 0.05 wt % to about 0.5 wt % of a total wt % of the printable composition. In examples, the biocide is present at about 0.18 wt %, or at about 0.14 wt % of a total wt % of the ink. It is to be understood that the upper limit for the biocide(s) may depend upon the type of biocide and its toxicological effect and/or regulatory requirements. For example, the upper limit for PROXEL® GXL (Arch Chemicals, Inc., Norwalk, Conn.) is 0.2 wt %. Suitable biocides include, for example, PROXEL® GXL, KORDEK® MLX (The Dow Chemical Co.), and/or BIOBAN® CS-1246 (The Dow Chemical Co.).

The printable composition may be colourless, i.e. free from any pigment, dye or colorant, or may be coloured with any color, such as black, cyan, magenta, yellow, etc. As such, in addition to the carrier fluid and curable polyurethane dispersion, the printable composition may also include a colorant. In an example, the colorant is a self-dispersed pigment added to the printable composition. In another example, the colorant is a pigment in a dispersion including water, the pigment, and a polymer that disperses the pigment (i.e., the polymer dispersant). In an example, the pigment dispersion may also include, for example, a co-solvent, such as 2-pyrrolidone. The pigment dispersion may be prepared or purchased, and the other components of the printable composition (e.g., carrier liquid and the polyurethane binder dispersion) may be slowly added to the pigment dispersion with continuous mixing, to form the printable composition.

As used herein, "pigment" may generally include organic or inorganic pigment colorants, magnetic particles, aluminas, silicas, and/or other ceramics, organo-metallics, metallic particulates, or other opaque particles that introduce color to the ink vehicle. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof. Any suitable pigment may be used, and while several examples are provided herein, it is to be understood that the list is non-limiting.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2. C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149. C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286. C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153. C.I. Pigment Yellow 154, C.I. Pigment Yellow 167, C.I. Pigment Yellow 172, C.I. Pigment Yellow 180, and C.I. Pigment Yellow 185.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN®5750, RAVEN®5250, RAVEN®5000, RAVEN®3500, RAVEN® 1255, and RAVEN®700); various carbon black pigments of the REGAL® series, the MOGUL® series, or the MONARCH® series manufactured by Cabot Corporation, Boston, Mass., (such as, e.g., REGAL® 400R, REGAL®330R, REGAL®660R, MOGUL® E, MOGUL® L, AND ELFTEX®410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX®35, PRINTEX® U, PRINTEX® V, PRINTEX®140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15. C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® RO100, STANDART® RO200, and DORADO® gold-bronze pigments (available from Eckart Effect Pigments, Wesel, Germany).

The total amount of pigment in the printable composition may range from about 1 wt % to about 5 wt % (based on the total wt % of the printable composition).

Method of Preparing Printable Composition

In some examples, there is provided a method of preparing a printable composition, comprising:

reacting a polyisocyanate and a (meth)acrylate-containing polyol to form a polyurethane pre-polymer;

reacting the polyurethane pre-polymer with a mono-alcohol having (meth)acrylate functionality to form a functionalised polyurethane pre-polymer; and reacting the functionalised polyurethane pre-polymer with an amino acid to form a radiation curable polyurethane; and dispersing the radiation curable polyurethane in a liquid carrier.

The method comprises reacting a polyisocyanate as described herein, and a (meth)acrylate-containing polyol, also as described herein, to form a polyurethane pre-polymer.

In some examples, the polyisocyanate and (meth)acrylate-containing polyol are selected to have a NCO/OH (isocyanate to hydroxyl) ratio of at least 1.2. In other words, an excess of polyisocyanate is used in forming the polyurethane pre-polymer. In some examples, the ratio of polyisocyanate to (meth)acrylate-containing polyol used to form the polyurethane pre-polymer is at least 1.5, for example at least 2, for example at least 3, for example at least 4, for example at least 5. In some examples, the ratio of polyisocyanate to (meth)acrylate-containing polyol used to form the polyurethane pre-polymer is less than 5, for example less than 4, for example less than 3, for example less than 2, for example about 1.2. In some examples, the ratio of polyisocyanate to (meth)acrylate-containing polyol used to form the polyurethane pre-polymer is from 1.2 to 5, for example from 1.5 to 4, for example from 1.8 to 3, for example from 2 to 2.5.

In some examples, the polyisocyanate and (meth)acrylate-containing polyol are reacted at a temperature of at least 30° C., for example at least about 40° C., for example at least about 50° C., for example at least about 60° C., for example at least about 70° C., for example about 80° C. In some examples, the polyisocyanate and (meth)acrylate-containing polyol are reacted at a temperature of less than about 80° C., for example less than about 70° C. for example less than about 60° C., for example less than about 50° C., for example less than about 40° C., for example about 30° C. In some examples, the polyisocyanate and (meth)acrylate-containing polyol are reacted at a temperature of from 30° C. to 70° C., for example from 40° C. to 70° C., for example from about 50° C. to 70° C., for example from 50° C. to 60° C.

In some examples, the polyisocyanate and (meth)acrylate-containing polyol are reacted in the presence of a catalyst. Any suitable catalyst which catalyses the reaction of the polyisocyanate and (meth)acrylate-containing polyol may be used. In some examples, the polyisocyanate and (meth)acrylate-containing polyol are reacted in the presence of a transition metal catalyst. In some examples, the transition metal catalyst is an organo-transition metal catalyst, for example a organo-tin catalyst. In some examples, the catalyst comprises a dibutyl tin catalyst, such as a dibutyltin laurate or dibutyl tin dioctanoate catalyst.

In some examples, the polyisocyanate and (meth)acrylate-containing polyol are reacted in the presence of a polymerisation inhibitor, for example a compound which inhibits the radical homopolymerisation of the (meth)acrylate-containing polyol. In some examples, the polymerisation inhibitor comprises mequinol (MEHQ, 4-methoxyphenol).

The method comprises reacting the polyurethane pre-polymer with a mono-alcohol having (meth)acrylate functionality as described herein to form a functionalised polyurethane pre-polymer.

In some examples, the polyurethane pre-polymer and mono-alcohol having (meth)acrylate functionality are reacted at a temperature of at least 30° C., for example at least about 40° C., for example at least about 50° C., for example at least about 60° C., for example at least about 70° C., for example about 80° C. In some examples, the polyurethane pre-polymer and mono-alcohol having (meth)acrylate functionality are reacted at a temperature of less than about 80° C., for example less than about 70° C., for example less than about 60° C., for example less than about 50° C., for example less than about 40° C., for example about 30° C. In some examples, the polyurethane pre-polymer and mono-alcohol having (meth)acrylate functionality are reacted at a temperature of from 30° C. to 70° C., for example from 40° C. to 70° C., for example from about 50° C. to 70° C., for example from 50° C. to 60° C.

In some examples, the polyurethane pre-polymer and mono-alcohol having (meth)acrylate functionality are reacted in the presence of a catalyst. Any suitable catalyst which catalyses the reaction of the polyurethane pre-polymer and mono-alcohol having (meth)acrylate functionality may be used. In some examples, the polyurethane pre-polymer and mono-alcohol having (meth)acrylate functionality are reacted in the presence of a transition metal catalyst. In some examples, the transition metal catalyst is an organo-transition metal catalyst, for example a organo-tin catalyst. In some examples, the catalyst comprises a dibutyl tin catalyst, such as a dibutyltin laurate or dibutyl tin dioctanoate catalyst.

In some examples, the polyurethane pre-polymer and mono-alcohol having (meth)acrylate functionality are reacted in the presence of a polymerisation inhibitor, for example a compound which inhibits the radical homopolymerisation of the mono-alcohol having (meth)acrylate functionality. In some examples, the polymerisation inhibitor comprises mequinol (MEHQ, 4-methoxyphenol).

The method comprises reacting the functionalised polyurethane pre-polymer with an amino acid to form a radiation curable polyurethane.

In some examples, the functionalised polyurethane pre-polymer and amino acid are reacted at a temperature of at least 20° C., for example at least about 25° C., for example at least about 30° C., for example at least about 35° C., for example at least about 40° C., for example about 50° C. In some examples, the functionalised polyurethane pre-polymer and amino acid are reacted at a temperature of less than about 50° C., for example less than about 40° C., for example less than about 35° C., for example less than about 30° C., for example less than about 25° C., for example about 20° C. In some examples, the functionalised polyurethane pre-polymer and amino acid are reacted at a temperature of from 20° C. to 50° C., for example from 30° C. to 45° C., for example from about 35° C. to 45° C., for example about 40° C.

In some examples, the amino acid is added to the functionalised polyurethane pre-polymer as an aqueous solution, and stirred until the solution turns clear. In some examples, a liquid carrier is added to the polymer solution to form a dispersion of the radiation curable polyurethane polymer in the liquid carrier, followed by removal of any residual organic solvent. In some examples, water is added to the polymer solution to form a dispersion of the radiation curable polyurethane polymer in water.

In some examples, the ratio of the sum of the mono-alcohol having (meth)acrylate functionality and amino acid to polyisocyanate used to form the polyurethane is from 1:3 to 3:1. In some examples, when the amount of amino acid used to form the polyurethane is denoted "x", the amount of mono-alcohol having (meth)acrylate functionality is "2-x", and the ratio of the sum of the mono-alcohol having (meth)acrylate functionality and amino acid to polyisocyanate used to form the polyurethane is from 1:3 to 3:1, for example from 2:1 to 1:2, for example about 1:1. Unless otherwise stated, references herein to amounts in connection with ratios of reactants are to molar amounts, and thus molar ratios.

In some examples, the polymer particles of the resultant printable solution comprising a radiation curable polyurethane polymer dispersion have a particle size (d95) of at least 20 nm, for example at least 25 nm, for example at least 30 nm, for example at least 40 nm, for example at least 50 nm, for example at least 60 nm, for example at least 70 nm, for example at least 80 nm, for example at least 90 nm, for example about 100 nm.

In some examples, the polymer particles of the resultant radiation curable polyurethane polymer dispersion have a particle size (d95) of less than 100 nm, for example less than 90 nm, for example less than 80 nm, for example less than 70 nm, for example less than 60 nm, for example less than 50 nm, for example less than 40 nm, for example less than 30 nm, for example less than 25 nm, for example about 20 nm. Unless otherwise stated, particle sizes are measured on a Malvern Zetasizer following the standard measurement protocol.

In some examples, the resultant radiation curable polyurethane polymer dispersion has a pH of at least 6, for example at least 6.5, for example at least 7, for example at least 7.5, for example at least 8, for example at least 8.5, for example at least 9, for example about 9.5. In some examples, the resultant radiation curable polyurethane polymer dispersion has a pH of less than 9, for example less than 8.5, for example less than 8, for example less than 7.5, for example less than 7, for example less than 6.5, for example about 6. In some examples, the resultant radiation curable polyurethane polymer dispersion has a pH of from 6 to 8, for example from 6.5 to 7.5. If required, the pH of the radiation curable polyurethane dispersion can be adjusted depending on requirement.

In some examples, the resultant radiation curable polyurethane polymer dispersion has a solids content of at least 15 wt % (based on the total weight of the dispersion), for example at least 20 wt %, for example at least 30 wt %, for example at least 40 wt %, for example about 50 wt %. In some examples, the resultant radiation curable polyurethane polymer dispersion has a solids content of less than 50 wt % (based on the total weight of the dispersion), for example less than 40 wt %, for example less than 30 wt %, for example less than 20 wt %, for example about 15 wt %. In some examples, the resultant radiation curable polyurethane polymer dispersion has a solids content of from 15 wt % to 50 wt %, for example from 20 wt % to 40 wt %, for example about 30 wt %.

Once the radiation curable polyurethane polymer dispersion has been formed in the liquid carrier, the formulation is suited for use as a printable composition. In other examples, the radiation curable polyurethane dispersion may be diluted with additional liquid carrier to form a printable composition. In some examples, the radiation curable polyurethane dispersion may be added to liquid carrier in an amount of at least 5 wt % of the total weight of the printable composition, for example at least 6 wt %, for example at least 7 wt %, for example at least 8 wt %, for example at least 9 wt %, for example at least 10 wt %, for example at least 11 wt %, for example at least 12 wt %, for example at least 13 wt %, for example at least 14 wt %, for example about 15 wt %. In some examples, the radiation curable polyurethane dispersion may be added to liquid carrier in an amount of less than 15 wt % of the total weight of the printable composition, for example less than 14 wt %, for example less than 13 wt %, for example less than 12 wt %, for example less than 11 wt %, for example less than 10 wt %, for example less than 9 wt %, for example less than 8 wt %, for example less than 7 wt %, for example less than 6 wt %, for example about 5 wt %. In some examples, the radiation curable polyurethane dispersion may be added to liquid carrier in an amount of from 5 wt % to 15 wt % of the total weight of the printable composition, for example from 7 wt % to 12 wt %, for example from 9 wt % to 11 wt %, for example about 10 wt %.

In some examples, one or more additives as described herein, such as a pigment, may be added to the dispersion to produce a printable solution in the form of an inkjet ink formulation.

Method of Printing

In some examples there is provided a method of printing, comprising:
  printing a composition comprising:
    a liquid carrier; and
    a radiation curable polyurethane dispersed in the liquid carrier, the curable polyurethane formed from:
      a polyisocyanate;
      a (meth)acrylate-containing polyol;
      a mono-alcohol having (meth)acrylate functionality; and
      an amino acid; and
  irradiating the printed composition.

In some examples, irradiating the printed composition produces a cured printed image. In some examples the method of printing comprises a method of inkjet printing. In some examples, the method of printing comprises jetting the composition onto an intermediate transfer member of an inkjet printing apparatus. In some examples, the printed composition is irradiated on the intermediate transfer member and the cured printed image then transferred to a print substrate.

Accordingly, in some examples there is provided a method of printing, comprising:
  jetting onto an intermediate transfer member or transfer blanket of an inkjet printing apparatus a composition comprising:
    a liquid carrier; and
    a radiation curable polyurethane dispersed in the liquid carrier, the curable polyurethane formed from:
      a polyisocyanate;
      a (meth)acrylate-containing polyol;
      a mono-alcohol having (meth)acrylate functionality; and
      an amino acid; and
  irradiating the jetted composition on the intermediate transfer member or transfer blanket to form a cured printed image; and
  transferring the cured printed image to a print substrate.

The term "intermediate transfer member", as used herein, is to be used interchangeably with the term "transfer blanket", and refers to a rubber or silicone coated roller or drum of the inkjet printing apparatus onto which a composition is jetted. The transfer member is termed intermediate due to being located intermediate the printhead and the print substrate. Such transfer members are known from offset or electrostatic printing processes.

In some examples, the method of printing is a method of transfer inkjet printing and further comprises at least partially drying the printed composition on the transfer blanket before irradiating the printed composition. In some examples, at least partially drying the printed composition comprises removing at least some liquid carrier from the printed composition. In some examples, removing at least some of the liquid carrier from the printed composition comprises removing at least 50 wt. % of the liquid carrier, in some examples, at least 55 wt. %, in some examples, at least 60 wt. %, in some examples, at least 65 wt. %, in some examples, at least 70 wt. %, in some examples, at least 75 wt. %, in some examples, at least 80 wt. %, in some examples, at least 85 wt. %, in some examples, at least 90 wt. %, in some examples, at least 95 wt. %, in some examples, at least 99 wt. % of the liquid carrier. In some examples, the method of transfer inkjet printing further comprises fully drying the printed composition before irradiating the printed composition.

In some examples, drying a printed composition is accomplished by directing dry radiant heat or a flow of hot air at the printed composition on the intermediate transfer member. In some examples, drying a printed composition is aided by a vacuum drying system which removes the vapour produced on drying.

In some examples, drying is accomplished by heating the intermediate transfer member. In some examples, the intermediate transfer member is heated before the composition is jetted onto the intermediate transfer member. In some examples, the intermediate transfer member is heated to at least 50° C., in some examples, at least 55° C., in some examples, at least 60° C., in some examples, at least 65° C., in some examples, at least 70° C., in some examples, at least 75° C. in some examples, at least 80° C., in some examples, at least 85° C., in some examples, at least 90° C., in some examples, at least 95° C., in some examples, at least 100° C., in some examples, at least 105° C., in some examples, at least 110° C., in some examples, at least 115° C., in some examples, at least 120° C., in some examples, at least 125° C., in some examples, at least 130° C., in some examples, at least 135° C. in some examples, at least 140° C., in some examples, at least 145° C., in some examples, about 150° C. In some examples, the intermediate transfer member is heated to 150° C. or less, in some examples, 145° C. or less, in some examples, 140° C. or less, in some examples, 135° C. or less, in some examples, 130° C. or less, in some examples, 125° C. or less, in some examples, 120° C. or less, in some examples, 115° C. or less, in some examples, 110° C. or less, in some examples, 105° C. or less, in some examples, 100° C. or less, in some examples, 95° C. or less, in some examples, 90° C. or less, in some examples, 85° C. or less, in some examples, 80° C. or less, in some examples, 75° C. or less, in some examples, 70° C. or less, in some examples, 65° C. or less, in some examples, about 50° C. In some examples, the intermediate transfer member is heated to about 50° C. to about 150° C., in some examples, about 55° C. to about 145° C., in some examples, about 60° C. to about 140° C., in some examples, about 65° C. to about 135° C., in some examples, about 70° C. to about 130° C., in some examples, about 75° C. to about 125° C., in some examples, about 80° C. to about 120° C. in some examples, about 85° C. to about 115° C., in some examples, about 90° C. to about 110° C., in some examples, about 95° C. to about 105° C., in some examples, about 95° C. to about 100° C., in some examples, about 100° C. to about 105° C.

In some examples, drying is accomplished by directing a flow of gas, for example, air, at the printed composition on the intermediate transfer member. In some examples, drying is accomplished by directing a flow of heated gas, for examples, hot air, at the printed composition on the intermediate transfer member. In some examples, the air is heated to at least 50° C., in some examples, at least 55° C., in some examples, at least 60° C., in some examples, at least 65° C., in some examples, at least 70° C. in some examples, at least 75° C., in some examples, at least 80° C., in some examples, at least 85° C., in some examples, at least 90° C., in some examples, at least 95° C., in some examples, at least 100° C., in some examples, at least 105° C., in some examples, at least 110° C., in some examples, at least 115° C., in some examples, at least 120° C., in some examples, at least 125° C., in some examples, at least 130° C., in some examples, at least 135° C., in some examples, at least 140° C., in some examples, at least 145° C., in some examples, about 150° C. In some examples, the air is heated to 150° C. or less, in some examples, 145° C. or less, in some examples, 140° C. or less, in some examples, 135° C. or less, in some examples, 130° C. or less, in some examples, 125° C. or less, in some examples, 120° C. or less, in some examples, 115° C. or less, in some examples, 110° C. or less, in some examples, 105° C. or less, in some examples, 100° C. or less, in some examples, 95° C. or less, in some examples, 90° C. or less, in some examples, 85° C. or less, in some examples, 80° C. or less, in some examples, 75° C. or less, in some examples, 70° C. or less, in some examples, 65° C. or less, in some examples, about 50° C. In some examples, the air is heated to about 50° C. to about 150° C., in some examples, about 55° C. to about 145° C., in some examples, about 60° C. to about 140° C., in some examples, about 65° C. to about 135° C., in some examples, about 70° C. to about 130° C., in some examples, about 75° C. to about 125° C., in some examples, about 80° C. to about 120° C., in some examples, about 85° C. to about 115° C., in some examples, about 90° C. to about 110° C., in some examples, about 95° C. to about 105° C., in some examples, about 95° C. to about 100° C., in some examples, about 100° C. to about 105° C.

In some examples, irradiating the printed composition comprises curing the radiation curable polyurethane via exposure to a source of actinic radiation, for example visible light, ultraviolet light, electron beam irradiation, ionising radiation, non-ionising radiation, or any combination thereof. In some examples, ionising radiation comprises gamma rays. In some examples, non-ionising radiation comprises microwave irradiation. In some examples, irradiating the printed composition comprises exposing the printed composition to UV light from a suitable light source. In some examples, the step of irradiating the jetted composition comprises irradiating to form an at least partially cured printed image. In some examples, the step of irradiating the jetted composition comprises irradiating to form a fully cured printed image.

In some examples, the method of printing is a method of transfer inkjet printing comprises irradiating at a wavelength of about 10 nm to about 600 nm, in some examples, about 100 nm to about 550 nm, in some examples, about 200 nm to about 500 nm, in some examples, about 300 to about 450 nm, in some examples, about 310 nm to about 440 nm, in some examples, about 320 nm to about 430 nm, in some examples, about 330 nm to about 420 nm, in some examples about 340 nm to about 410 nm, in some examples, about 350 nm to about 405 nm, in some examples, about 360 nm to about 400 nm, in some examples, about 365 nm to about 390 nm, in some examples, about 370 nm to about 385 nm, in some examples, about 375 nm to about 380 nm. In some examples, the method of transfer inkjet printing comprises irradiating at a wavelength of about 360 nm to about 370 nm, in some examples, about 380 nm to about 390 nm, in some examples, about 390 nm to about 400 nm, in some examples, about 400 nm to about 410 nm. In some examples, the method of transfer inkjet printing comprises irradiating at a wavelength of about 365 nm, about 385 nm, about 395 nm or about 405 nm.

In some examples, the printed composition on the intermediate transfer member is irradiated for 10 µs or more, in some examples, 50 µs or more, in some examples, 100 µs or more, in some examples, 200 µs or more, in some examples, 300 µs or more, in some examples, 400 µs or more, in some examples, 500 µs or more, in some examples, 600 µs or more, in some examples, 700 µs or more, in some examples, 800 µs or more, in some examples, 900 µs or more, in some examples, 1 ms or more, in some examples, 10 ms or more, in some examples, 100 ms or more, in some examples, 500 ms or more, in some examples, 1 s or more, in some examples, about 10 s. In some examples, the printed composition on the intermediate transfer member is irradiated for 10 s or less, in some examples, 1 s or less, in some examples, 500 ms or less, in some examples, 100 ms or less, in some examples, 10 ms or less, in some examples, 1 ms or less, in some examples, 900 µs or less, in some examples, 800 µs or less, in some examples, 700 µs or less, in some examples, 600 µs or less, in some examples, 500 µs or less, in some examples, 400 µs or less, in some examples, 300 µs or less, in some examples, 200 µs or less, in some examples, 100 µs or less, in some examples, 50 µs or less, in some examples, about 10 µs. In some examples, the printed composition on the intermediate transfer member are irradiated for about 10 µs to about 10 s, in some examples, about 50 µs to about 1 s, in some examples, about 100 µs to about 500 ms, in some examples, about 200 µs to about 100 ms, in some examples, about 300 µs to about 10 ms, in some examples, about 400 µs to about 1 ms, in some examples, about 500 µs to about 900 µs, in some examples, about 600 µs to about 800 µs, in some examples, about 600 µs to about 700 µs, in some examples, about 700 µs to about 800 µs.

In some examples, the method of printing is performed on an inkjet printing apparatus. In some examples, the method of printing is performed on an inkjet printing apparatus having an intermediate transfer member and a source of actinic radiation, for example a UV source. In some examples, the method of printing is performed on a thermal inkjet printing apparatus. In some examples, the method of printing comprises printing the composition using a standard inkjet printing apparatus onto a media substrate, and exposing the printed composition on the media substrate to a source of actinic radiation to cure the printed composition to form a printed image.

Examples

The following Examples illustrate a number of variations of aqueous curable polyurethane dispersions and methods of printing using the dispersions. However, it is to be understood that the following are only examples or illustrative of the application of the principles of the stable dispersions and related aspects. Numerous modifications and alternative curable polyurethane dispersions may be made without departing from the spirit and scope of the printable compositions and related aspects. The appended claims are intended to cover such modifications and arrangements. Thus, while the present methods and related aspects have been described above with particularity, the following examples provide further detail in connection with what are presently deemed to be acceptable.

Reagents:

BGDA (a diacrylate ester of bisphenol A diglycidyl ether): MEHQ (4-methoxyphenol); H12MDI (4,4'-methylenebis(cyclohexyl isocyanate)); DBTDL (Dibutyltin dilaurate) and HEAA (hydroxyethylacrylamide); and the amino acids are all commercially available from Sigma-Aldrich.

Synthesis of Curable PUD Using 2-Alanine 39.649 g of BGDA, 0.396 g of MEHQ, 42.931 g of H12MDI and 30 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples was withdrawn for % NCO titration to confirm the reaction. 12.560 g of HEAA, 0.126 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. The polymerization temperature was reduced to 40° C. 4.86 g of 2-alanine (2-Ala), 4.582 g of 50% NaOH, and 24.298 g of deionized water are mixed in a beaker until 2-alanine is completely dissolved. The 2-alanine solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 202.225 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. The final PUD dispersion was filtered through fiber glass filter paper. Particle size (d95) measured by Malvern Zetasizer is 64.94 nm. The pH was measured as 7.5. Solid content 30.01%.

Synthesis of Curable PUD Using 1-Alanine 39.649 g of BGDA, 0.396 g of MEHQ, 42.931 g of H12MDI and 30 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples was withdrawn for % NCO titration to confirm the reaction. 12.560 g of HEAA, 0.126 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. The polymerization temperature was reduced to 40° C. 4.86 g of 1-alanine (1-Ala), 4.582 g of 50% NaOH, and 24.298 g of deionized water are mixed in a beaker until 1-alaine is completely dissolved. The 1-alanine solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 202.225 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size (d95) measured by Malvern Zetasizer is 59 nm. Its pH was 7.5. Solid content was 30.51%.

Synthesis of Curable PUD Using Valine 39.649 g of BGDA, 0.396 g of MEHQ, 42.931 g of H12MDI and 30 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples was withdrawn for % NCO titration to confirm the reaction. 12.560 g of HEAA, 0.126 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. The polymerization temperature was reduced to 40° C. 6.294 g of Valine (DL), 4.513 g of 50% NaOH, and 31.469 g of deionized water are mixed in a beaker until Valine (DL) is completely dissolved. The Valine (DL) solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 196.305 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size (d95) measured by Malvern Zetasizer is 28.94 nm. Its pH was 7.0. Solid content was 30.93%.

Synthesis of Curable PUD Using Asparagine 39.649 g of BGDA, 0.396 g of MEHQ, 42.931 g of H12MDI and 30 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples was withdrawn for % NCO titration to confirm the reaction. 12.560 g of HEAA, 0.126 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. The polymerization temperature was reduced to 40° C. 7.041 g of Asparagine (Asp), 4.477 g of 50% NaOH, and 35207 g of deionized water are mixed in a beaker until Asparagine (Asp) is completely dissolved. The Asparagine (Asp) solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 193.219 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size (d95) measured by Malvern Zetasizer is 28.09 nm. Its pH was 7.5. Solid content was 30.80%.

Inkjet Formulations

The polyurethane dispersions were formulated into TIJ inks based on the following composition:

TABLE 1

| Component | Wt. % |
|---|---|
| Surfynol ® CT-211 | 0.80% |
| DX-4000 | 0.50% |
| TPA Na | 0.50% |
| M-TX-PEG-350 | 0.25% |
| Curable PUD | 10.00% |
| DIC-QA magenta | 4.00% |
| Water | Balance |

Surfynol® CT-211 is a non-ionic surfactant from Evonik; DX-4000 is a fluorosurfactant from Dynax; DIC-QA magenta is a magenta pigment dispersion from DIC. TPA-Na is water soluble photo initiator as described herein; M-TX-PEG-350 is water soluble sensitizer also as described herein. Curable PUD is a curable polyurethane dispersion in accordance with the Examples: Table 2 below lists the polymer composition of polyurethane dispersions capped with various amino acid capping groups.

The inks were printed on an inkjet printer testbed at 100 ft/min and cured under LED at 25 ft/min.

Following printing, the ink films were subject to the following rub tests:

a) Eraser—1 Weight (250 g), 10 Cycles;

b) Windex—1 Weight (250 g), 5 Cycles, Crockmeter Cloth:

c) 70% IPA (isopropyl alcohol) Rub—1 Weight (250 g), 5 Cycles, Crockmeter Cloth;

d) Water—No Weight (0 g), 1 Cycle, Crockmeter Cloth.

Dry Rub: 10 Cycles, 250 g Weight, CS-10 Rubber Eraser, 2 in. Length;

Wet Rub: 5 Cycles, 250 g Weight, Windex/70% IPA, 2 in. Length;

Quanta regular Sutherland 4 lbs, 200 cycles—Mellotex rubbing paper. Sutherland rub tests performed in accordance with ASTM D5264-98(2011);

Tape adhesion test: first a cross-hatch was created on top of image, then we apply a tape on top of the cross-hatch, then peel the tape off from the cross-hatch, then durability was graded by how much of the ink was removed.

Test criteria (visual evaluation) is: 5—Fail (ink is fully removed), 1—Excellent rub resistance. Note: "0" is a perfect score. Threshold is "2". For hot Sutherland and regular Sutherland tests, 5—is perfect score and 1 is the worst.

OD was measured by OD meter from X-Rite: it was measured three times and the average value was reported. Gloss measurement was measured by micro-tri-gloss 75° C. from BYK, which is a 75 degree angle Glossmeter.

In order to assess storage life of the inkjet formulations, they were subjected to an accelerated storage life (ASL) treatment, comprising storage in an oven at 50° C. for 7 days.

Changes in pH and d95 as a result of the ASL test were performed by measuring absolute values before and after ASL treatment. The results of all tests are shown in Table 3.

TABLE 2

PUD Compositions

| Example | Amino Acid | Total solid (%) | Particle size (d95/nm) | Acid Number | Double bond density | H12MDI (%) | BGDA (%) | Amino Acid (%) | HEAA (%) | pH | NCO/OH ratio |
|---|---|---|---|---|---|---|---|---|---|---|---|
| 1 | Gly | 30.56 | 34.72 | 32 | 2.8 | 44.829 | 34.502 | 4.276 | 16.394 | 7 | 2.4 |
| 2 | 2-Ala | 30.26 | 29.21 | 31.7 | 2.8 | 44.474 | 34.228 | 5.034 | 16.264 | 7.5 | 2.4 |
| 3 | 2-Ala | 30.1 | 64.94 | 30.6 | 2.7 | 42.931 | 39.649 | 4.86 | 12.56 | 7.2 | 2 |
| 4 | 1-Ala | 30.45 | 27.23 | 31.7 | 2.8 | 44.474 | 34.228 | 5.034 | 16.264 | 7.5 | 2.4 |
| 5 | 1-Ala | 30.51 | 59.05 | 30.6 | 2.7 | 42.931 | 39.649 | 4.86 | 12.56 | 7.5 | 2 |
| 6 | Val | 30.19 | 29.49 | 31.2 | 2.8 | 43.779 | 33.694 | 6.516 | 16.01 | 7.5 | 2.4 |
| 7 | Val | 30.93 | 28.94 | 30.1 | 2.7 | 42.284 | 39.052 | 6.294 | 12.371 | 7 | 2 |
| 8 | Glu | 30.11 | 24.93 | 29.7 | 2.6 | 41.635 | 38.453 | 7.731 | 12.181 | 7 | 2 |
| 9 | Asn | 30.8 | 28.09 | 29.9 | 2.7 | 41.947 | 38.74 | 7.041 | 12.272 | 7.5 | 2 |
| 10 | Asp | 30.71 | 26.72 | 59.8 | 2.7 | 41.925 | 38.72 | 7.09 | 12.266 | 7.5 | 2 |
| 11 | Phe | 30.7 | 27.86 | 29.4 | 2.6 | 41.22 | 38.069 | 8.651 | 12.059 | 7.5 | 2 |
| 12 | Ile | 30.52 | 30.02 | 29.9 | 2.7 | 41.968 | 38.76 | 6.994 | 12.278 | 7.5 | 2 |
| 13 | Leu | 30.03 | 28.15 | 29.9 | 2.7 | 41.968 | 38.76 | 6.994 | 12.278 | 7.5 | 2 |

TABLE 3

| Ex. | OD | 75° Gloss | Eraser Rub | Windex Rub | 70% IRA | Wet Rub | Tape Adhesion | Sutherland (standard) | ΔpH | Δd95 |
|---|---|---|---|---|---|---|---|---|---|---|
| 1 | 1.42 | 70.1 | 2 | 0.5 | 4 | 0 | 1 | 4 | 0.43 | 2 |
| 2 | 1.44 | 71.6 | 2 | 0.5 | 4.5 | 0 | 3 | 5 | 0.44 | 2 |
| 3 | 1.34 | 64.2 | 3 | 0 | 0.5 | 0 | 0 | 4 | 0.37 | 0 |
| 4 | 1.34 | 72.9 | 3 | 0 | 2 | 0 | 2 | 4 | 0.39 | 3 |
| 5 | 1.2 | 73.3 | 2 | 0 | 0.5 | 0 | 3 | 5 | 0.39 | 4 |
| 6 | 1.19 | 78 | 3.5 | 0.5 | 3 | 0 | 0 | 5 | 0.41 | −3 |
| 7 | 1.42 | 78.4 | 2 | 0 | 0.5 | 0 | 2 | 5 | 0.43 | 3 |
| 8 | 1.15 | 71 | 2.5 | 0.5 | 2 | 0 | 0 | 5 | 0.4 | 1 |
| 9 | 1.11 | 72.6 | 3 | 0.5 | 2 | 0 | 0 | 5 | 0.22 | 1 |
| 10 | 1.18 | 69 | 2.5 | 0.5 | 2.2 | 0 | 0 | 5 | 0.27 | 5 |
| 11 | 1.01 | 68.4 | 3 | 0 | 2 | 0 | 0 | 5 | 0.28 | 3 |
| 12 | 0.96 | 66.8 | 2.5 | 0.5 | 1.5 | 0 | 0 | 5 | 0.34 | 10 |
| 13 | 0.9 | 69 | 2.5 | 0.5 | 2 | 0 | 0 | 5 | 0.32 | 12 |

Table 3 demonstrated the inks' ASL stability and ink film durability after printing. Table 3 demonstrates that pH stability is good with an amino acid as a capping agent. Almost all of the tested examples showed less than 0.5 pH drop after 1 week ASL. All of the ink films showed excellent durability including Windex, wet rub, Sutherland rub, eraser rub and excellent tape adhesion. It can also be seen that a lower ratio of NCO/OH provides for better durability to the IPA rub.

While the printable compositions and related aspects have been described with reference to certain examples, those skilled in the art will appreciate that various modifications, changes, omissions, and substitutions can be made without departing from the spirit of the disclosure. It is intended, therefore, that the present compositions and related aspects be limited only by the scope of the following claims. The features of any dependent claim can be combined with the features of any of the other dependent claims or independent claims.

The invention claimed is:

1. A printable composition, comprising:
   a liquid carrier; and
   a radiation curable polyurethane dispersed in the liquid carrier, the curable polyurethane formed from:
   a polyisocyanate;
   a (meth)acrylate-containing polyol including a diglycidyl ester;
   a mono-alcohol having (meth)acrylate functionality; and
   an amino acid, wherein the amino acid comprises one or more of, valine, glutamine, asparagine, glutamic acid, phenylalanine, and proline.

2. A printable composition according to claim 1, further comprising a colorant.

3. A printable composition according to claim 1, wherein the amino acid comprises one or more of glutamine, glutamic acid, phenylalanine, and proline.

4. A printable composition according to claim 1, wherein the polyisocyanate comprises a diisocyanate having a molecular weight of less than 500.

5. A printable composition according to claim 1, wherein the (meth)acrylate-containing polyol comprises a (meth)acrylate-containing diol having a molecular weight of less than 500.

6. A printable composition according to claim 1, wherein the mono-alcohol having (meth)acrylate functionality has a molecular weight of less than 500.

7. A printable composition according to claim 1, wherein the ratio of polyisocyanate to (meth)acrylate-containing polyol used to form the polyurethane is from 1.2:1 to 5:1.

8. A printable composition according to claim 1, wherein the ratio of the sum of the amounts of mono-alcohol having (meth)acrylate functionality and amino acid to polyisocyanate used to form the polyurethane is from 1:3 to 3:1.

9. A printable composition according to claim 1, wherein the polyurethane has an acid number of from 20 to 100.

10. A method of preparing a printable composition, comprising:
reacting a polyisocyanate and a (meth)acrylate-containing polyol to form a polyurethane pre-polymer, wherein the (meth)acrylate-containing polyol includes a diglycidyl ester;
reacting the polyurethane pre-polymer with a mono-alcohol having (meth)acrylate functionality to form a functionalised polyurethane pre-polymer; and
reacting the functionalised polyurethane pre-polymer with an amino acid to form a radiation curable polyurethane, wherein the amino acid comprises one or more of, valine, glutamine, asparagine, glutamic acid, phenylalanine, and proline; and
dispersing the radiation curable polyurethane in a liquid carrier.

11. A method of printing, comprising:
printing a composition comprising:
a liquid carrier; and
a radiation curable polyurethane dispersed in the liquid carrier, the curable polyurethane formed from:
a polyisocyanate;
a (meth)acrylate-containing polyol, wherein the (meth)acrylate-containing polyol includes a diglycidyl ester;
a mono-alcohol having (meth)acrylate functionality; and
an amino acid, wherein the amino acid comprises one or more of valine, glutamine, asparagine, glutamic acid, phenylalanine, and proline; and
irradiating the printed composition.

12. A method according to claim 11, wherein printing the composition comprises jetting the composition onto an intermediate transfer member of an inkjet printing apparatus.

13. A method according to claim 12, wherein the printed composition is irradiated on the intermediate transfer member and then transferred to a print substrate.

14. A method according to claim 11, wherein the method is performed on an inkjet printing apparatus having an intermediate transfer member and a source of actinic radiation.

15. A method according to claim 10, including reacting the amino acid with unreacted isocyanate groups on the functionalised polyurethane pre-polymer.

16. A printable composition according to claim 1, wherein the (meth)acrylate-containing polyol lacks a carboxylic acid functional group.

17. A printable composition according to claim 1, wherein the mono-alcohol having (meth)acrylate functionality lacks a carboxylic acid functional group.

18. A printable composition according to claim 1, wherein the mono-alcohol having (meth)acrylate functionality includes a methacrylic ester.

19. A printable composition according to claim 1, wherein the mono-alcohol having (meth)acrylate functionality includes an acrylic ester.

20. A printable composition according to claim 1, wherein the amino acid comprises one or more of valine, and asparagine.

* * * * *